F. CUNNINGHAM.
Harvester-Rake.

No. 221,723. Patented Nov. 18, 1879.

Witnesses:
J. W. Garner
Otto Stein.

Inventor:
F. Cunningham,
per
F. A. Lehmann,
Atty.

UNITED STATES PATENT OFFICE.

FRANCIS CUNNINGHAM, OF GREEN MOUNT, PENNSYLVANIA.

IMPROVEMENT IN HARVESTER-RAKES.

Specification forming part of Letters Patent No. 221,723, dated November 18, 1879; application filed October 18, 1879.

*To all whom it may concern:*

Be it known that I, FRANCIS CUNNINGHAM, of Green Mount, in the county of Adams and State of Pennsylvania, have invented certain new and useful Improvements in Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in rakes for harvesters; and it consists in hinging the rake to the outer end of the rake-arm, and connecting to the rake an operating-rod, which rod has its movements controlled by a cam that is secured to the rake-track, so as to cause the rake to assume a position parallel to the knives as it approaches them, as will be more fully described hereinafter.

Figure 1:
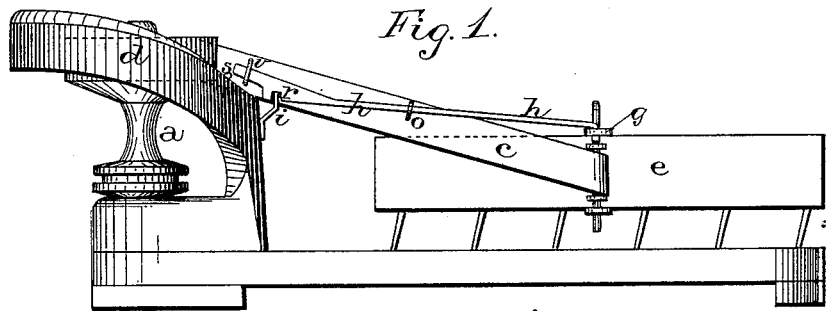
Figure 2:
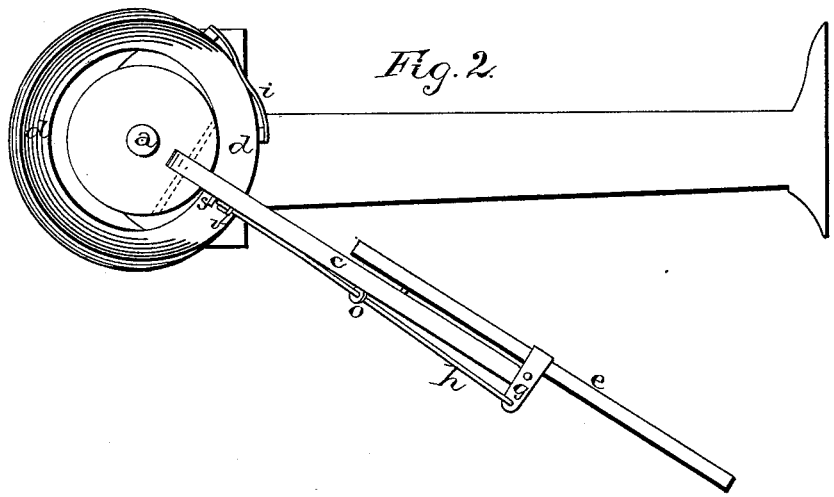

Figure 1 is a side elevation of my invention. Fig. 2 is a plan view of the same.

$a$ represents the shaft, to which one or more rake-arms, $c$, are pivoted, and $d$ is the rake-track. These parts may be constructed and operated in any of the well-known ways. Hinged, pivoted, or otherwise loosely attached to the outer end of the arm $c$ is the rake $e$, and from this rake projects the arm $g$. Attached to the rear end of this arm is the connecting-rod $h$, which extends inward along the arm over and beyond the cam $i$ on the outer and lower part of the track $d$. To the arm $c$ are secured one or more guides, $o$, for the rod to pass through, so that it will always be held rigid and stiff, and thus be prevented from springing out to one side should any obstruction occur, and cause the rake to be presented at an angle to the cutting-knife.

In the lower edge of the inner end of the rod $h$ is made the notch $r$, which, as the rake-arm slides down the front part of the track, catches over the top edge of the cam $i$, and as the arm moves over the top of the cam the rake $e$ is caused by the rod $h$ and arm $g$ to swing around into a line parallel with the cutting-knife, and thus rake the uncut grain evenly to the knives and platform. As soon as the rod has passed off the rear end of the cam $i$ the rod ceases to affect the rake in so far as swinging it around is concerned; but as the rod slips off the cam the end of the rod catches against the stop $s$, and thus locks the rake rigidly in position in a line with the arm $c$, and holds it there until the arm has moved up over the track and again reached the cam. As the rod catches over the front end of the cam the end of the rod is raised upward in its keeper $u$ high enough to pass over the stop, when the rod can be forced in and out, according to the shape of the cam.

More than one cam $i$ may be used, and attached to different parts of the track.

Having thus described my invention, I claim—

1. The combination of the operating-shaft $a$ and the rake-lever $c$, pivoted thereto, track $d$, hinged rake $e$, arm $g$, connected to the rake and pivoted on the end of the lever $c$, arm $h$, for moving the rake, and cam $i$, the parts being arranged to operate substantially as shown.

2. In a harvester-rake, the combination of a rake-arm, a rake movably attached thereto, a connecting-rod, cam, and stop, whereby the rake is moved into line with the cutter and then automatically locked in position while the arm is moving around up over the track, substantially as described.

In testimony that I claim the foregoing I have hereunto set my hand and seal this 13th day of October, 1879.

FRANCIS CUNNINGHAM. [L. S.]

Witnesses:
EDW. G. FAHNESTOCK,
EDW. J. COX.